Nov. 8, 1960   H. S. JONES   2,959,678
THERMAL IMAGING DEVICE
Filed Jan. 4, 1957
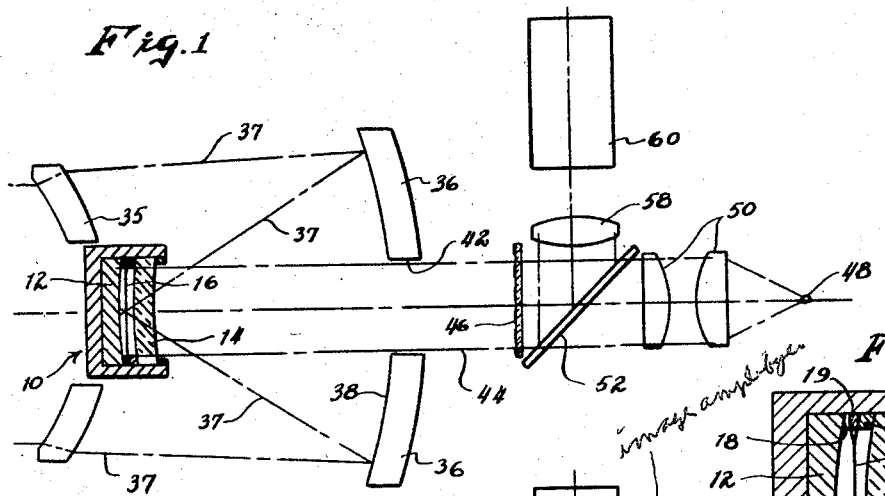
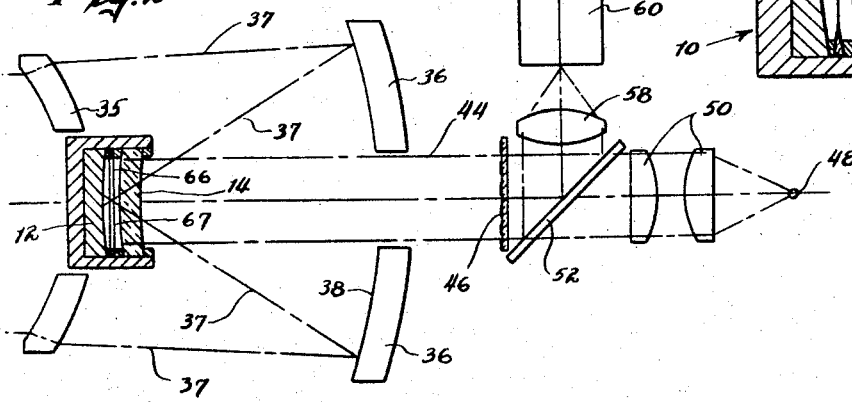
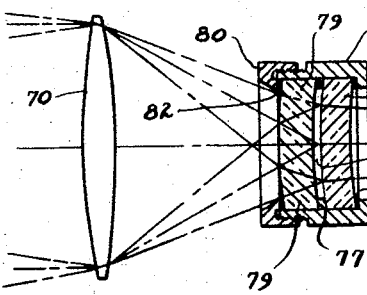
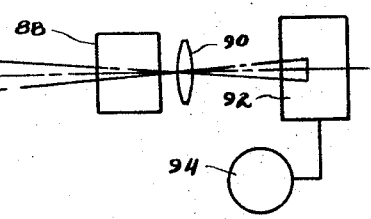
INVENTOR.
Harry S. Jones.
BY Emery, Whittemore
Sandoe & Dix
ATTORNEYS

United States Patent Office 2,959,678
Patented Nov. 8, 1960

2,959,678
THERMAL IMAGING DEVICE
Harry S. Jones, 95 Washington St., East Orange, N.J.

Filed Jan. 4, 1957, Ser. No. 632,596

21 Claims. (Cl. 250—83)

This invention relates to a continuous type thermal image detector.

It is an object of the invention to provide an improved thermal image detector which is simpler than those of the prior art, and which gives a continuous image for visual or electronic observation. The term "observation" is used herein to designate a physical viewing by an observer with or without electronic amplification, and the photographing of the image using light in the visible spectrum.

The invention makes use of the fact that variations in the temperature of a gas cause changes in the density and this in turn causes changes in the optical index of refraction of the gas. The effects of these changes in the index of refraction with change of temperature are familiar to everyone who has observed the light refraction produced by the warm air layer close to the surface of a road when looking along the road at nearly grazing incidence; or from observation of objects through the hot air currents rising from a chimney or engine.

The invention utilizes a cell having a chamber containing a gas through which visible light is passed. The gas is heated by a thermal image focused in the cell, and the change in the refraction of the visible light by temperature differences in the gas produces the visible image.

Another object of the invention is to provide an improved thermal image detector that possesses high sensitivity, a high signal-to-noise ratio, a very short time constant of response, high resolution, and the ability to respond either to one or more limited bands in the thermal spectrum, or to the entire thermal wave length range, as required. The invention provides a detector which is simple, rugged, compact, and insensitive to external disturbances of mechanical, electrical, optical and thermal origin.

One of the principal advantages of the invention is its rapid response of the resulting image detection which is observed at the time of the action producing the thermal image.

This invention utilizes a thin layer of gas, preferably a radiation-absorbing gas isolated between two side walls which form the cell. The gas is heated by the thermal image. In one modification of the invention a membrane coated with a heat absorbing surface material is directly heated by the thermal image and supplies heat by contact with the gas. In another modification of the invention the radiation absorbing gas is confined between two optically transparent membranes which are supported at a sufficient distance from the end walls of the cell to prevent loss of heat by conduction to the cell walls.

In the third modification of the invention the gas is confined between the end walls of the cell and is directly heated by focusing the thermal image on a focal surface within the gas.

The expression "focal surface" is used herein to designate the equivalent of a "focal plane" of a lens or reflector but without the limitation that the focus take place within a plane. The surface may be slightly concave or convex but it will be understood that it is a mathematical surface and not a physical surface.

Other objects, features and advantages of the invention will appear or be pointed out as the description proceeds.

In the drawing, forming a part hereof, in which like reference characters indicate corresponding parts in all the view:

Figure 1 is a diagrammatic view of the preferred form of the invention;

Figure 2 is a view similar to Fig. 1, but showing a modified form of the invention;

Figure 3 is an enlarged sectional view showing the details of the construction of the cell used in Fig. 1;

Figure 4 is a diagrammatic view showing a second modification of the invention; and Figure 5 is a greatly enlarged fragmentary, sectional view illustrating the principal of operation of the construction shown in Fig. 4.

The apparatus shown in Fig. 1 includes a cell housing 10 which encloses a front wall 12 and a back wall 14. The walls 12 and 14 are spaced from one another so as to enclose a chamber between them, and this chamber is filled with a fluid, usually in the gaseous state. A membrane 16 forms a partition across the chamber between the walls 12 and 16.

Figure 3 is a detailed view of the construction of the cell. The front wall 12 is held against the end of the housing 10 by spacer rings 18, 19 and 20, and these rings are clamped together by pressure from the back wall 14 which is, in turn, held in position by a retaining ring 22 anchored in a groove 24 in the inside surface of the housing 10. The membrane 16 has its circumferential edge portion surrounding the ring 19 and clamped between the ring 19 and the spacer rings 18 and 20. This membrane 16 is as close to the inside surfaces of the front and back walls 12 and 14, respectively, as is thermally practical; that is, enough clearance is provided to prevent conduction of heat to the walls 12 and 14 from the boundary layer of gas immediately adjacent to the surface of the membrane 16.

In practice, packing rings and gaskets are used between the end walls and spacer rings and between spacer rings to obtain a gas-tight chamber between the end walls, but these sealing expedients are omitted from the drawing for greater clarity of illustration since they are in common use wherever elements must be connected together by gas-tight seals.

The front wall 12 has an inside surface 30 which reflects visible light. This can be made of various metals with a high polish. The surface 30 is preferably spherical or some other shape which will focus an image at a focal surface some distance back from the cell as will be more fully explained in connection with the description of the optical system.

The back wall 14 is made of material which will transmit both infrared and visible radiation. Transparent rock salt (NaCl) and thallium bromide-iodide (TlBr–I) are suitable materials.

The membrane 16 is made of material which will transmit at least a substantial portion of the visible radiation which strikes it. It is desirable, however, to have the membrane 16 absorb a large fraction of the infrared or thermal radiation and in order to make the membrane absorb infrared radiation more readily, the membrane 16 is preferably coated with an absorbent material. A well known material for the purpose is gold-black. (1) (Journal of The Optical Society of America, February 1952, vol. 42, No. 2.) The amount of gold-black coating applied to the membrane is usually limited so that the membrane will transmit between 20 and 50% of the visible light which strikes it.

The cell is more sensitive to infrared radiation and forms a stronger thermal image if more gold-black is applied to the membrane, but the visible image produced by the apparatus is brighter if less gold-black is applied and the membrane transmits more of the visible light. If the apparatus is designed for observation with little or no amplification of the visible image, then it is desirable to transmit more visible light; but if the visible image is to be detected electronically by means of a multiplier photo-tube, an image orthicon, or light amplifier, then more coating can be used to obtain a stronger thermal image and the brightness of the visible image is less important.

Referring again to Fig. 1, infra-red radiation is transmitted through an annular corrector plate 35 to a focuser 36, the path of representative rays being indicated by the dot-and-dash lines 37. In Fig. 1 the focuser 36 is an annular concave reflector having a surface 38 which reflects infra-red radiation. Infra-red reflecting materials suitable for surface 38 include gold and aluminum. Rock salt and thallium bromide-iodide are materials suitable for corrector plate 35, and the purpose of this plate is to refract the light rays in directions to facilitate the focus by the reflecting focuser 36.

The reflector surface 38 is located in position to focus a thermal image on the infra-red absorbing coating of membrane 16. The amount of infra-red radiation absorbed by the coating on the membrane will depend upon the intensity of the radiation at different parts of the area of the image, and the gas close to the heated surface of the membrane will change in density in accordance with the unequal heating caused by the thermal image.

There is a center opening 42 through the reflecting surface 38 and a beam of visible light 44 is projected through the opening 42 and through the back wall 14 and membrane 16 to the reflecting surface of the front wall 12. This visible light is reflected back from the front wall 30 with considerable diminution as a result of its double passage through the coated membrane 16, but the reflection is directly back through the opening 42.

A critical pattern grid 46 is located in the path of the light beam 44. The beam 44 originates at a source 48, such as the filament of an incandescent bulb, and the light passes from the source 48 through condensers 50 and through a partly transmitting partly reflecting mirror 52, and then through the gird 46. This partly transmitting, partly reflecting mirror 52 is a well known piece of optical equipment and is commonly referred to as a "beam-splitter."

The critical pattern grid 46 is preferably a slotted plate having one or more parallel slots. The slots are preferably optical openings and not physical openings, and the width of the slots shown in Fig. 1 is greatly exaggerated for clearer illustration.

It is not essential that the critical pattern grid be made with parallel slots. Theoretically, bulls eye slots would be just as good but they are physically more difficult to make. The critical pattern of the grid could consist of small circular openings in polka dot relation or even openings forming a checkerboard.

The important feature is that the critical pattern grid 46 is at the focal surface of the reflecting surface of the front wall 12 so that an image of the grid 46 is focused back on the grid by the reflected light. Refraction of the light by the gas in the cell will cause some of the reflected rays to strike the grid 46 partially behind the solid portions of the grid and the amount by which a ray is refracted during reflection will determine how much of the rays strikes the grid at a solid area and how much of the light ray comes through a slot of the grid. Thus the differences in the density and consequent refraction of the visible light by the gas in the cell produce a visible pattern or image behind the grid 46. This image is reflected by the beam-splitter 52 and passes through a lens 58 to an eye piece or an electronic image amplifying device 60.

The critical optical system illustrated herein operates on the basic "Foucault Principle" (2) (Foucault: Annaler de L'Observatore Imperial de Paris, 1859, vol. 5, pp. 197–237) but other types of critical optical systems can be used, such as described in various scientific publications (3), (4), and (5):

(3) Zernike, F.: Diffraction Theory of the Knife-Edge Test and Its Improved Form, the Phase Contrast Method. Royal Astronomical Soc., March 1934.
(4) Burch, C. R.: On the Phase Contrast Test of F. Zernike. Royal Astronomical Soc., March 1934.
(5) Ramsay, J. V.: A Phase Contrast Method for the Study of the State of Polish of Single Glass Surfaces, Journal of Scientific Instruments, The Institute of Physics, London, vol. 28, page 24, 1951.

The membrane 16 is preferably made of collodion, such membranes are well known and they are formed on a smooth water surface to obtain an extremely thin membrane. The gold black material with which the membrane is coated is evaporated under near vacuum condition and absorbs heat rapidly. Because of the small thermal mass of the membrane and gold black, the combination has a quick response which is in the order of only a small fraction of a second.

The gas used within the cell should have low thermal diffusivity, this being a measure of the time rate at which heat spreads through the gas. The diffusivity of a gas is equal to its thermal conductivity divided by the product of the density times the specific heat of the gas at constant pressure. It will be evident that the gas cell of the invention will produce a sharper, stronger thermal image if the diffusivity of the gas is low. A low value can be obtained by using xenon which has a low thermal conductivity and which does not absorb infra-red radiation, and by operating the gas cell with the xenon in the chamber at super atmospheric pressure. Since the density is in the denominator in the diffusivity equation, any increase in density caused by increased pressure reduces the diffusivity of the gas. By way of illustration, the pressure in the gas cell may be made as much as 50 atmospheres. The use of xenon at 25 atmospheres in lieu of air at one atmosphere will result in a 5 fold improvement in the thermal image resolution of this device, that is, objects 5 times smaller and radiating less than $\frac{1}{25}$ as much thermal energy will be detected.

Fig. 2 shows a modified form of the invention in which corresponding parts are indicated by the same reference characters as in the construction shown in Fig. 1. The difference in Fig. 2 is that the gas cell is made with two membranes 66 and 67 which are spaced from one another and enclose a thin layer of an infra-red absorbing gas between them. An example of such an infra-red absorbing gas is $C_2Cl_2F_4$ (usually known as Freon 114). The thermal image is focused by the reflector surface 38, at a location in the gas between the membranes 66 and 67. The space between the membranes and the front and back walls 12 and 14, respectively, is preferably filled with some other gas which does not absorb infra-red radiation readily such as xenon. As in the case of the gas cells shown in Fig. 1, the cell illustrated in Fig. 2 is preferably operated at super atmospheric pressure, and while the membranes 66 and 67 cannot withstand any substantial pressure differential, infra-red absorbing gas between these membranes can be at any desired pressure if the other gas outside the membranes is at an equal pressure. The membranes 66 and 67 need not be coated and the visible light beam 44 is transmitted through these membranes 66 and 67 with very little reduction in brightness. The thermal image is formed by the absorption of the infra-red radiation by the gas confined between the membranes 66 and 67 as a result of its corresponding density variations.

Fig. 4 shows a second modified form of the invention in which the thermal image is formed by a lens 70 instead of by a reflector surface as in the construction already described. The lens 70 is preferably made of material having a high index of refraction for infra-red radiation. Suitable materials are germanium, rock salt, arsenic, trisulphide, and thallium, bromide-iodide. This latter material is usually sold under the trade symbol "KRS–5."

The lens cells for the construction shown in Fig. 4 include an annular housing 72 with a flange 73 at its rearward end. A back wall 74 of the gas cell seats against a sealing ring 77 located between the back wall 74 and a front wall 79. The front wall 79 is held in position and the assembly is clamped together by a ring 80 threaded over the end of the housing 72 and clamping a sealing ring 82 against the outside surface of the front wall 79.

A gas chamber 84 between the spaced walls 74 and 79 is filled with infra-red absorbing gas; for example Freon 114 or carbon dioxide.

The front wall 79 is made of material through which a substantial portion of the infra-red radiation will pass, but the material also reflects some radiation within the visible spectrum.

Suitable materials for the purpose are KRS–5, germanium, and silicon.

The back wall 74 is made of material which is partially transparent to visible light but which will reflect a substantial amount of infrared radiation. This back wall may be made of glass having a thin metallic coating.

The lens 70 focuses the thermal image at a location within the space occupied by gas in the chamber 84. The gas is heated unevenly to produce local variations in density as a result of the absorption of the different amounts of radiant infra-red energy resulting from differences in the intensity of radiation over different parts of the image.

Visible light is projected from a critical optical system, shown indicated by the reference character 88, through the back wall 74, through the gas in the chamber 84 and against the inside surface of the front wall 79. The visible light is reflected back from this inside surface of the front wall and the surface is curved so as to focus the reflected light in the optical system in a manner already explained in connection with Figs. 1 and 2. The visible image is focused by another lens 90 on an electronic presentation system indicated by the reference character 92. An electronic presentation screen 94 is used to view the image.

Fig. 5 shows the principle of operation of the gas cell of Fig. 4. Infrared rays 96 are partially absorbed as they pass through the gas in the chamber 84, and any unabsorbed radiation is reflected back from the inside face of the back wall 74 as indicated by the arrows along the infrared ray 96. During the travel of the reflected ray back through the gas substantially all of the remaining energy of the ray is absorbed by the gas. A ray of visible light 98 passes through the back wall 74 and through the gas in the chamber 84; and this ray is reflected back again along a course indicated by the reference character 98', the direction of this reflected beam 98' will vary in accordance with the density, and the resulting index of refraction of the gas in the chamber 84 to change the local illumination of different parts of the area of the image produced in the critical optical system which may be the same as that already described in Figs. 1 and 2, or any other known system suitable for the purpose.

The preferred embodiment of this invention has been illustrated and described, but changes and modifications can be made, and some features can be used in different combinations without departing from the invention as defined in the claims.

What is claimed is:

1. Heat image apparatus including a cell having a fluid chamber therein filled with fluid, front and back walls of the cell, at least one of the walls forming an infrared window for admitting infrared rays into the fluid chamber, a focuser that focuses an infrared image in the cell at a location to heat a portion of the fluid in said chamber, means for causing the inside surface of the front wall to transmit visible light rays through the heat image in the fluid in said chamber and out of the cell through one wall thereof, and an optical system in position to observe the visible light rays transmitted out of the cell after passage of the rays through the heat image in the fluid.

2. The heat image apparatus described in claim 1 and in which the inside surface of the front wall is a reflector of visible light rays and the optical system includes means for directing visible light rays toward said inside surface of the front wall for reflection back through the heat image in the fluid, the optical system including means located in the path of the reflected visible rays and being responsive to differences in refraction of the rays by the fluid within the cell.

3. The heat image apparatus described in claim 1 and in which the inside front surface of the chamber is a reflector of visible light and curved to focus an image at a focal surface outside of the cell, the optical system including a part having a sharp edge pattern thereon located substantially at said focal surface and having openings therein and means for directing light through the openings to the reflecting surface of the cell for reflection back with an image of the pattern formed upon itself by the reflected rays, and in which the means for observing the reflected visible rays are located beyond the pattern on the side opposite the cell so that the only rays observed are those which are reflected back through the openings in the pattern.

4. The heat image apparatus described in claim 3 and in which there is a partly reflecting, partly transmitting mirror in the path of the light beam directed toward the reflecting surface of the cell from behind the pattern and the mirror is also in the path of the beam of light reflected to the observing means, one of the light beams being reflected by the mirror to its intended path and the other of the light beams being transmitted through the mirror along its intended course.

5. The heat image apparatus described in claim 1 and in which the focuser is a lens constructed of at least one material from the group consisting of germanium, rock salt, arsenic, trisulphide and thallium bromide-iodide.

6. The heat image apparatus described in claim 1 and in which the optical system includes means for directing visible light rays toward the inside front surface of the cell and that surface reflects the light rays back through the fluid within the cell and through the back of the cell which is transparent to visible light, the back wall being made of material transparent to both visible and infrared radiation.

7. The heat image apparatus described in claim 5 and in which the inside front surface of the chamber is curved to focus an image reflected back, and the light reflected by the inside front surface is light projected on it through a critical pattern grid and then through the back wall of the cell, and the critical pattern grid is located at the focal surface of the curved reflecting surface of the inside front surface of the cell so that an image of the grid is formed on the grid by the reflected light.

8. A heat image apparatus comprising a cell having a fluid chamber therein containing a fluid of low thermal diffusivity and at super atmospheric pressure, the fluid cell having front and back walls with inside surfaces that confront one another on opposite sides of the fluid chamber, the inside surface of the front wall being a reflector for visible light and curved to focus an image at a focal plane located outside of the fluid chamber and beyond the back wall thereof, the back wall of the cell being transparent to visible rays, an optical system including a critical pattern or grid located at the focal plane of the front surface reflector, means for projecting light through the critical pattern grid and through the back wall of the cell to the reflecting rear surface of the front wall of the cell which directs the light back to form an image of the critical pattern or grid at said critical pattern or grid, and means for observing reflected light that passes through the critical pattern or grid.

9. The heat image apparatus described in claim 8 and in which the cell is filled with Freon.

10. A heat image apparatus comprising a cell having a chamber therein filled with gas, a heat absorbing membrane forming a partition across the chamber, the membrane also being of semi-light-transmitting material, the gas chamber having a front inside surface which is a reflector of visible light, a focuser that focuses an infrared image at a location in the cell adjacent to the membrane to produce a heat image in the gas that is adjacent to the membrane, and a critical optical system in position to observe the visible light rays which are reflected back from the front surface of the cell through the heat image in the gas and through the membrane.

11. The heat image apparatus described in claim 10 and in which the gas within the cell is an infra-red absorbing gas and the membrane is coated with a heat-absorbing coating, and the focuser focuses the infra-red image on the membrane coating, and the inside front surface of the gas chamber is curved to reflect back to a focal surface rays of visible light which are directed to the front surface through a critical pattern or grid of the optical system.

12. The heat image apparatus described in claim 11 and in which the gas cell is filled with gas of low thermal diffusivity and at super atmospheric pressure, and in which the membrane is coated with infrared absorbing material and the back wall of the cell is transparent to both visible and infrared rays and the focuser is a reflector that reflects infrared rays through the back wall to focus the infrared image on the absorbing surface of the membrane.

13. The heat image apparatus described in claim 10 and in which there is a second membrane spaced from the first membrane and enclosing a chamber between them, both of the membranes being spaced from the front and back walls of the gas chamber, the chamber between the membranes containing an infrared absorbing gas, the space in the cell outside of that between the membranes containing an infrared transparent gas of lower thermal diffusivity than the gas between the membranes and the focuser being located in position to focus the infrared image at a location between the membranes.

14. A heat image apparatus including a cell having a gas chamber therein and an infra-red absorbing membrane in the chamber, the gas cell being bounded on opposite sides by a surface of a front wall that reflects visible rays and by a back wall through which infrared rays pass into the gas within the cell, and an imaging device from which infra-red rays are directed through the back wall and through the gas and focused on the membrane in the chamber.

15. The heat image apparatus described in claim 14 and in which the membrane is surrounded by a gas of low thermal diffusivity and the inside front surface of the cell is curved to focus light rays at a focal surface, means for directing visible rays through the back wall and through the gas to the reflecting surface of the front wall, and a critical optical system for observing the rays reflected back through the gas within the cell.

16. A heat image apparatus including a cell having a gas chamber with an infra-red absorbing gas therein, the gas cell having a front wall through which infra-red rays pass into the gas within the cell, and a back wall having an infra-red reflecting surface confronting the front wall and in position to reflect forward through the gas any infra-red rays that succeed in passing from the front wall through the gas to the back wall and an imaging device from which infra-red rays are directed through the back wall and focused at a focal surface within the gas chamber whereby the energy of the focused rays of the thermal image is absorbed by the infra-red absorbing gas to change the local density of the gas in accordance with energy absorbed at different locations in the image.

17. An infrared imaging apparatus comprising a focusing device for focusing an infra-red image at a focal surface, a thin infra-red-absorbing, light transmitting membrane adjacent to the infra-red image and in which the energy of the infra-red image is partially dissipated, a fluid adjacent to the infra-red image, said fluid being of low thermal diffusivity and low infra-red absorption and high visible light transmission, a chamber in which the membrane and the fluid are enclosed, and which a fluid density pattern and corresponding optical refraction pattern is set up in the fluid adjacent to the membrane and corresponding to the infra-red image, and an optical system sensitive to small changes in optical refraction, and means for supplying light to said optical system through the fluid density pattern corresponding to the infra-red image.

18. An infra-red imaging apparatus comprising a focusing device for focusing an infra-red image at a focal surface, an infra-red-absorbing, light transmitting fluid adjacent to the infra-red image and in which a fluid density pattern and resulting optical refraction pattern is set up in the fluid adjacent to the membrane and corresponding to the infra-red image, an optical system sensitive to small changes in optical refraction, and means for passing light to the optical system through the fluid density pattern corresponding to the infra-red image.

19. An infra-red imaging apparatus comprising a focusing device for focusing an infra-red image at a focal surface, a layer of infra-red-absorbing, light-transmitting fluid adjacent to the infra-red image and surrounded by a fluid of low thermal diffusivity and low infra-red absorption and high visible light transmission, and an optical system sensitive to small changes in optical refraction utilizing light which passes through the fluid density pattern corresponding to the infra-red image.

20. An infra-red imaging apparatus comprising a focusing device for focusing an infra-red image at a focal surface, a fluid adjacent to said surface and in which a fluid density pattern is produced by uneven heating of the fluid by energy of the infra-red image formed within said fluid, apparatus for radiating, through the fluid and image, radiant energy of shorter wave length than infra-red, and an optical system utilizing said radiant energy and sensitive to small changes in the refraction index of the fluid corresponding to change in the density pattern of the fluid.

21. An infra-red imaging apparatus, comprising means confining a fluid under a super atmospheric pressure, a device for focusing an infra-red image at a focal surface in the fluid whereby a fluid density pattern is produced by uneven heating of the fluid by energy of the infra-red image formed within said fluid, and an optical system sensitive to small changes in the refraction index of the fluid corresponding to changes in the density pattern of the fluid.

References Cited in the file of this patent

UNITED STATES PATENTS

| | | |
|---|---|---|
| 2,435,519 | Tolson | Feb. 3, 1948 |
| 2,456,801 | Tolson | Dec. 21, 1948 |
| 2,557,096 | Golay | June 19, 1951 |
| 2,623,183 | Buck | Dec. 23, 1952 |
| 2,644,097 | Roop | June 30, 1953 |
| 2,690,093 | Daly | Sept. 28, 1954 |
| 2,798,961 | Wormser | July 9, 1957 |